(12) United States Patent
Hollenbach et al.

(10) Patent No.: US 11,379,288 B2
(45) Date of Patent: Jul. 5, 2022

(54) APPARATUS AND METHOD FOR EVENT CLASSIFICATION BASED ON BAROMETRIC PRESSURE SENSOR DATA

(71) Applicant: Infineon Technologies AG, Neubiberg (DE)

(72) Inventors: Andrea Hollenbach, Munich (DE); Cecilia Carbonelli, Munich (DE); Waldemar Marsetz, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 534 days.

(21) Appl. No.: 16/513,029

(22) Filed: Jul. 16, 2019

(65) Prior Publication Data

US 2020/0073748 A1 Mar. 5, 2020

(30) Foreign Application Priority Data

Aug. 30, 2018 (EP) ..................................... 18191752

(51) Int. Cl.
*G06F 11/07* (2006.01)
*G01L 27/00* (2006.01)
(Continued)

(52) U.S. Cl.
CPC ........ *G06F 11/0772* (2013.01); *G01L 27/005* (2013.01); *G06K 9/6267* (2013.01); *G06N 3/04* (2013.01); *G06N 7/005* (2013.01)

(58) Field of Classification Search
CPC .... G06F 11/07; G06F 11/0772; G01L 27/005; G06K 9/6267; G06K 9/00536; G06K 9/6268; G06N 3/04; G06N 7/005; G08B 29/186; G08B 13/04; G08B 13/08; G05B 23/0275; G05B 23/0221; G05B 23/024
See application file for complete search history.

(56) References Cited

U.S. PATENT DOCUMENTS 8,512,240 B1 * 8/2013 Zuckerman-Stark ........................ A61B 5/7275 128/924
9,498,138 B2 * 11/2016 Zuckerman-Stark ........................ A61B 5/0295
(Continued)

FOREIGN PATENT DOCUMENTS

CN 101528511 A * 9/2009 ........... B60R 21/013
CN 101587546 A * 11/2009 ............... G06K 9/00
(Continued)

*Primary Examiner* — Tung S Lau
(74) *Attorney, Agent, or Firm* — Slater Matsil, LLP

(57) ABSTRACT

An apparatus for event detection is provided. The apparatus comprises an error signal determiner for determining an error signal portion depending on a pressure signal. The error signal determiner determines a predicted signal portion depending on a first signal portion of the pressure signal. The error signal determiner also determines the error signal portion depending on the predicted signal portion and depending on a second signal portion of the pressure signal, wherein the second signal portion of the pressure signal succeeds the first signal portion of the pressure signal in time. The apparatus also comprises a classifier for determining, depending on the error signal portion, whether an event of a group of one or more events has occurred or whether no event of the group has occurred.

15 Claims, 13 Drawing Sheets

(51) Int. Cl.
*G06N 3/04* (2006.01)
*G06K 9/62* (2022.01)
*G06N 7/00* (2006.01)

(56) References Cited

U.S. PATENT DOCUMENTS

| | | |
|---|---|---|
| 9,940,825 B2 | 4/2018 | Khazanov et al. |
| 9,974,488 B2 * | 5/2018 | Najarian ................ G16H 50/20 |
| 2014/0266669 A1 * | 9/2014 | Fadell .................... G08B 19/00 |
| | | 340/501 |
| 2015/0374300 A1 * | 12/2015 | Najarian ................ G16Z 99/00 |
| | | 702/19 |
| 2019/0362613 A1 * | 11/2019 | Mandl ................... G08B 21/182 |
| 2019/0362614 A1 * | 11/2019 | Mandl .................... G10L 25/51 |

FOREIGN PATENT DOCUMENTS

| | | | | |
|---|---|---|---|---|
| CN | 101087559 B | * | 3/2011 | ............... A61B 5/08 |
| CN | 101587546 B | * | 5/2011 | ................ G06K 9/00 |
| CN | 102172328 A | * | 9/2011 | .......... A61B 5/4818 |
| CN | 106097654 A | | 11/2016 | |
| DE | 102009058797 A1 | | 6/2011 | |
| JP | 2008-525060 A | * | 7/2008 | ........... A61B 5/4818 |
| JP | 2009-168812 A | * | 7/2009 | ........... G01M 15/06 |
| JP | 5203984 B2 | * | 6/2013 | ........... G01M 15/05 |

\* cited by examiner ated tion No. 18191752.7, filed on Aug. 30, 2018, which application is hereby incorporated herein by reference.

APPARATUS AND METHOD FOR EVENT CLASSIFICATION BASED ON BAROMETRIC PRESSURE SENSOR DATA

This application claims the benefit of European Application No. 18191752.7, filed on Aug. 30, 2018, which application is hereby incorporated herein by reference.

TECHNICAL FIELD

The present invention relates to event classification based on barometric pressure sensor data, and, in particular, to an apparatus and method for event classification based on barometric pressure sensor data.

BACKGROUND

In the prior art, there exist several types of systems that can detect the presence of an intruder in an indoor environment. They are mostly based on motion sensors (e.g. infrared or magnetic sensors), contact sensors mounted to windows and doors or glass break sensors—either vibration based and directly applied to each glass pane of a window or door, or alternatively microphone based—which can supervise several windows in a room. Image sensors and cameras are also an option.

The signal measured at a barometric pressure sensor can be seen as a simpler (less installation effort) and cheaper alternative to the approaches mentioned above or it can be combined to the signals collected by the other sensors to augment their experience (sensor fusion).

In any case, it is worth mentioning that, in the presence of a window/door opening event or window/door glass break event, the pattern detected at the barometric pressure sensor has a very distinct shape whereas the signal captured with a microphone cannot be easily 'classified' as it is often to unspecific or can be mixed up with other events such as the break of a drinking glass.

As far as the specific detection algorithm is concerned, a simple state-of-the art approach is based on a combination of sensor signals (including a barometer) and thresholds. Due to its simplicity, this approach has the drawback of not being able to distinguish between different types of events (such as opening or tilting of a window of window crashing) and is prone to generate a too high number of false alarms.

A more complex approach consists of applying a Hidden Markov Model to the collected pressure sensor signals. This method requires the identification of the different states and transition probabilities from one state to the other which turns out to be quite challenging if different type of opening events needs to be classified (window open/tilted, door open, etc.) and the use of a simpler probabilistic model becomes thus more attractive.

SUMMARY

The object of the present invention is to provide improved concepts for event detection and classification. The object of the present invention is solved by an apparatus according to claim 1, by a method according to claim 14 and by a computer program according to claim 15.

An apparatus for event detection is provided. The apparatus comprises an error signal determiner configured for determining an error signal portion depending on a pressure signal. The error signal determiner is configured to determine a predicted signal portion depending on a first signal portion of the pressure signal. Moreover, the error signal determiner is configured to determine the error signal portion depending on the predicted signal portion and depending on a second signal portion of the pressure signal, wherein the second signal portion of the pressure signal succeeds the first signal portion of the pressure signal in time. Moreover, the apparatus comprises a classifier configured for determining, depending on the error signal portion, whether an event of a group of one or more events has occurred or whether no event of said group has occurred. Determining, whether an event occurred and which event occurred may, e.g., be referred to as classification.

A method for event detection. The method comprises: determining an error signal portion depending on a pressure signal. Determining the error signal portion comprises to determine a predicted signal portion depending on a first signal portion of the pressure signal. Moreover, determining the error signal portion further comprises to determine the error signal portion depending on the predicted signal portion and depending on a second signal portion of the pressure signal. The second signal portion of the pressure signal succeeds the first signal portion of the pressure signal in time, and determining, depending on the error signal portion, whether an event of a group of one or more events has occurred or whether no event of said group has occurred.

Moreover, a computer program configured to implement the above-described method when being executed on a computer or signal processor is provided.

BRIEF DESCRIPTION OF THE DRAWINGS

In the following, embodiments of the present invention are described in more detail with reference to the figures, in which.

DETAILED DESCRIPTION OF ILLUSTRATIVE EMBODIMENTS

Figure 1:
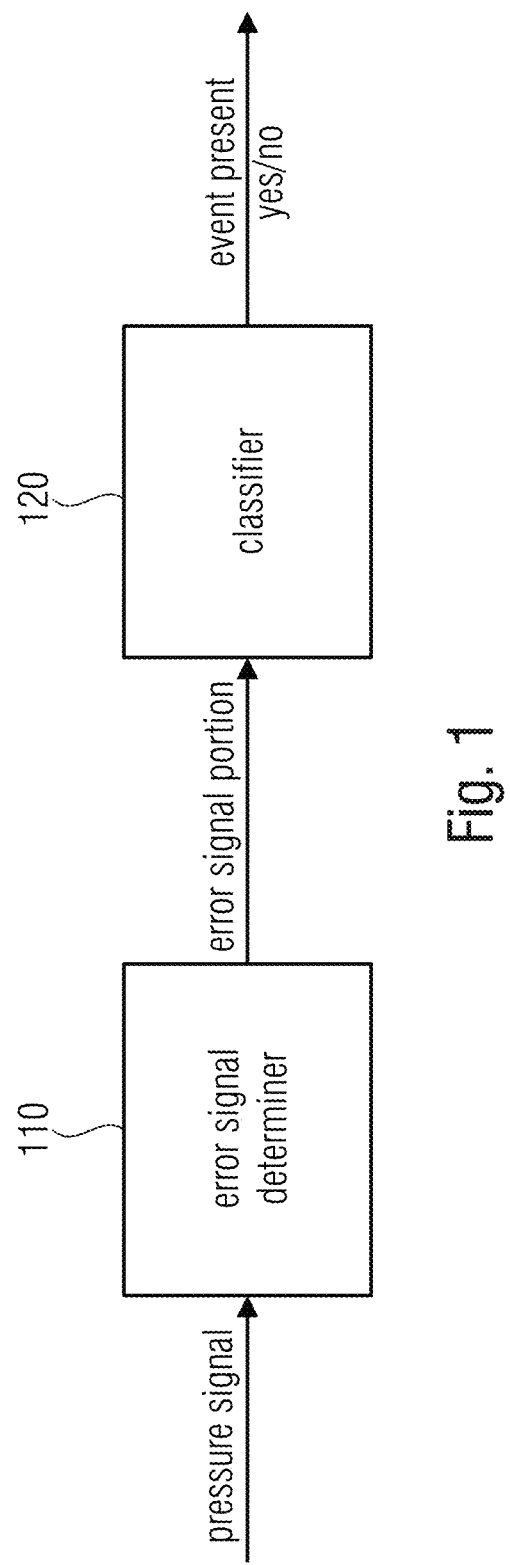
FIG. 1 illustrates an apparatus for event detection according to an embodiment.

FIG. 1 illustrates an apparatus for event detection according to an embodiment.

The apparatus comprises an error signal determiner 110 configured for determining an error signal portion depending on a pressure signal.

The error signal determiner 110 is configured to determine a predicted signal portion depending on a first signal portion of the pressure signal.

Moreover, the error signal determiner 110 is configured to determine the error signal portion depending on the predicted signal portion and depending on a second signal portion of the pressure signal. The second signal portion of the pressure signal succeeds the first signal portion of the pressure signal in time.

Moreover, the apparatus comprises a classifier 120 configured for determining, depending on the error signal portion, whether an event of a group of one or more events has occurred or whether no event of said group has occurred.

According to an embodiment, said group may, e.g., be a group of two or more events. The classifier 120 may, e.g., be configured for determining, depending on the error signal portion, which event out of a group of two or more events has occurred or whether no event of said group has occurred.

According to an embodiment, a first event of the group of two or more events may, e.g., be a window opening. A second event of the group of two or more events may, e.g., be a glass break.

Some embodiments relate to the classification of barometric pressure sensor signals for the identification of specific types of events such as a window or house door being opened or closed or the break of a window glass. Some embodiments are based on the finding that in the context of smart home and home scene analysis the identification of such events can be used for instance to detect that a burglar is entering a home or house. Moreover the classification of the barometric pressure signals enables a system to remind a house owner who is about to leave the house that a window is still open.

It has been observed that the signal measured at a barometric pressure sensor has a characteristic pattern, for example, depending on whether a window or a door in the home, where the sensor is placed, is being opened, tilted, broken or similar. The pattern remains distinctive not only in the affected room but in the whole home as long as doors inside the home are not tightly closed. It is thus natural to resort to a judicious combination of machine learning algorithms and related classification methods to identify the specific event and eventually trigger an alarm if, for instance, an intruder is being detected in an indoor environment with a high level of confidence.

Some of the embodiments may, e.g., employ a two-stage approach, which combines a predictor and a classification block. The complexity of the stages above can vary depending on the number of events ('classes') that need to be identified and on the number of environmental factors such as temperature, wind or weather conditions that may, e.g., be accounted for.

Figure 2:
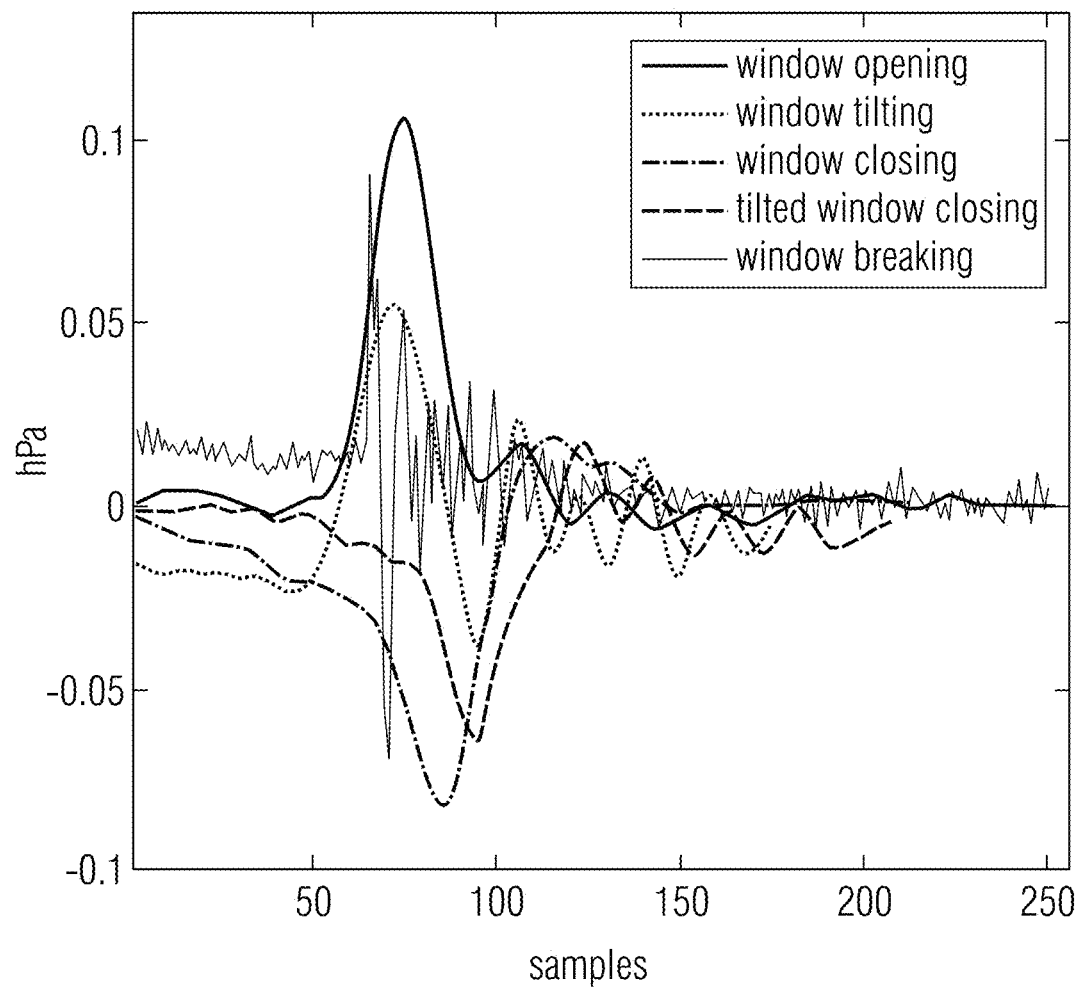
FIG. 2 illustrates pressure sensor waveforms.

In the following, some typical high pass filtered signals measured at the pressure sensor when different types of events occur are depicted in FIG. 2. For this purpose, FIG. 2 illustrates typical pressure sensor waveforms.

It can be seen that the signals above have a very distinctive pattern depending on whether the window is being opened, tilted, closed or broken. Also, it is observed that the noise variance of the signals changes depending on the outside weather conditions, such as wind or rain.

According to an embodiment, the error signal determiner 110 may, e.g., be configured to determine the error signal portion further depending on information on weather conditions. Weather conditions like wind or rain can for example affect the variance or standard deviation of the pressure signal and may, e.g., also be incorporated in the prediction, if available.

Figure 3:
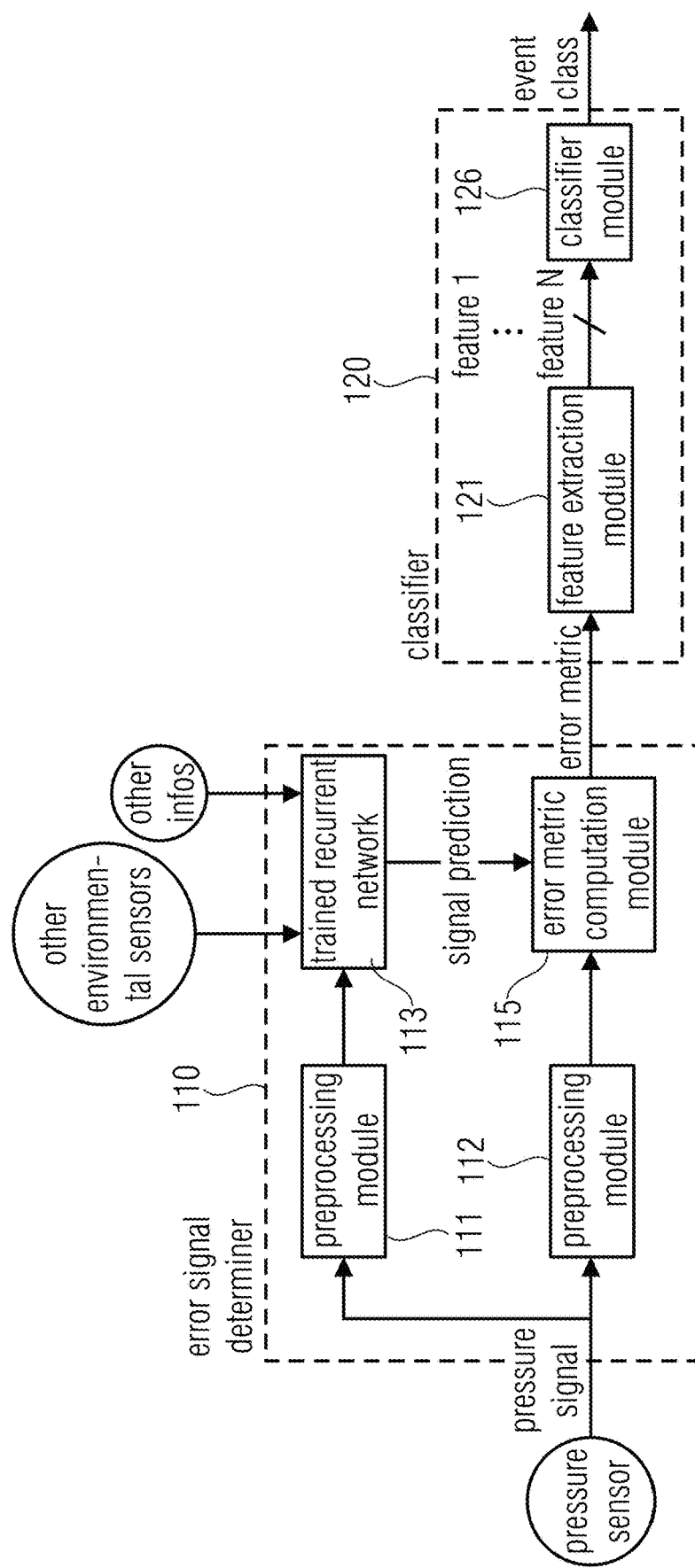
FIG. 3 illustrates modules of an apparatus according to some of the embodiments.

To identify the different events in FIG. 2, an embodiment as illustrated in FIG. 3 may, e.g., be employed. FIG. 3 illustrates modules of an apparatus according to some of the embodiments.

In the embodiment of FIG. 3, a pressure (input) signal is first preprocessed, e.g., by a first preprocessing module 111, and, e.g., by a second preprocessing module 112. In preferred embodiments, the first preprocessing module 111 and the second preprocessing module 112 may, e.g., conduct the same preprocessing steps. Preprocessing may, e.g., comprise, where needed, high pass or noise filtering, signal normalization, outliers' elimination, and so on, to obtain a preprocessed pressure signal.

The preprocessed signal portion obtained by preprocessing module 111 may, e.g., be considered as a first signal portion. The preprocessed signal portion obtained by preprocessing module 112 may, e.g., be considered as a second signal portion.

According to an embodiment, the error signal determiner 110 may, e.g., be configured to determine the predicted signal portion by employing a neural network 113.

A trained recurrent network 113 may e.g., then generate a prediction of the signal e.g., based on the pressure signal itself and e.g., based on additional data provided by other environmental sensors measuring the general weather conditions (such as temperature, wind, etc.). Window characteristics may, e.g., also be taken into account as further inputs. The prediction of the signal may, e.g., be considered as a predicted signal portion.

The signal prediction is then combined with the measured signal (e.g., the second signal portion obtained from the second preprocessing module 112) and an Error Metric is generated (e.g. an error signal or a more complex function), for example, by an error metric computation module 115. The Error Metric may, e.g., be considered as an error signal portion.

In other words, the error metric/the error signal portion may, e.g., be obtained by combining the second signal portion and the predicted signal portion.

For example, in an embodiment, the error signal determiner 110 may, e.g., be configured to determine the error signal portion by subtracting the second signal portion from the predicted signal portion. Or, the error signal determiner 110 may, e.g., be configured to determine the error signal portion by subtracting the predicted signal portion depending on the second signal portion.

The Error Metric is then the signal used for feature extraction, for example, conducted by a feature extraction module 121. Possible features are the derivative of the error metric, its mean and standard deviation, dynamic time warping (DTW), time correlation or similar. In addition or alternatively, an FFT (Fast Fourier transform) may, e.g., be employed.

The computed features are then sent to a generic classifier module 126, which eventually assigns the pressure signal to a given class. The classification algorithm could be one of the many supervised machine learning approaches available in the literature, for example an LDA or a Random Forest.

Both the recurrent network and the classifier module 126 in FIG. 3 may, e.g., be trained before being used as part of the event detection mechanism. The training phase is normally performed offline and illustrated in FIG. 4 and FIG. 5.

Figure 4:
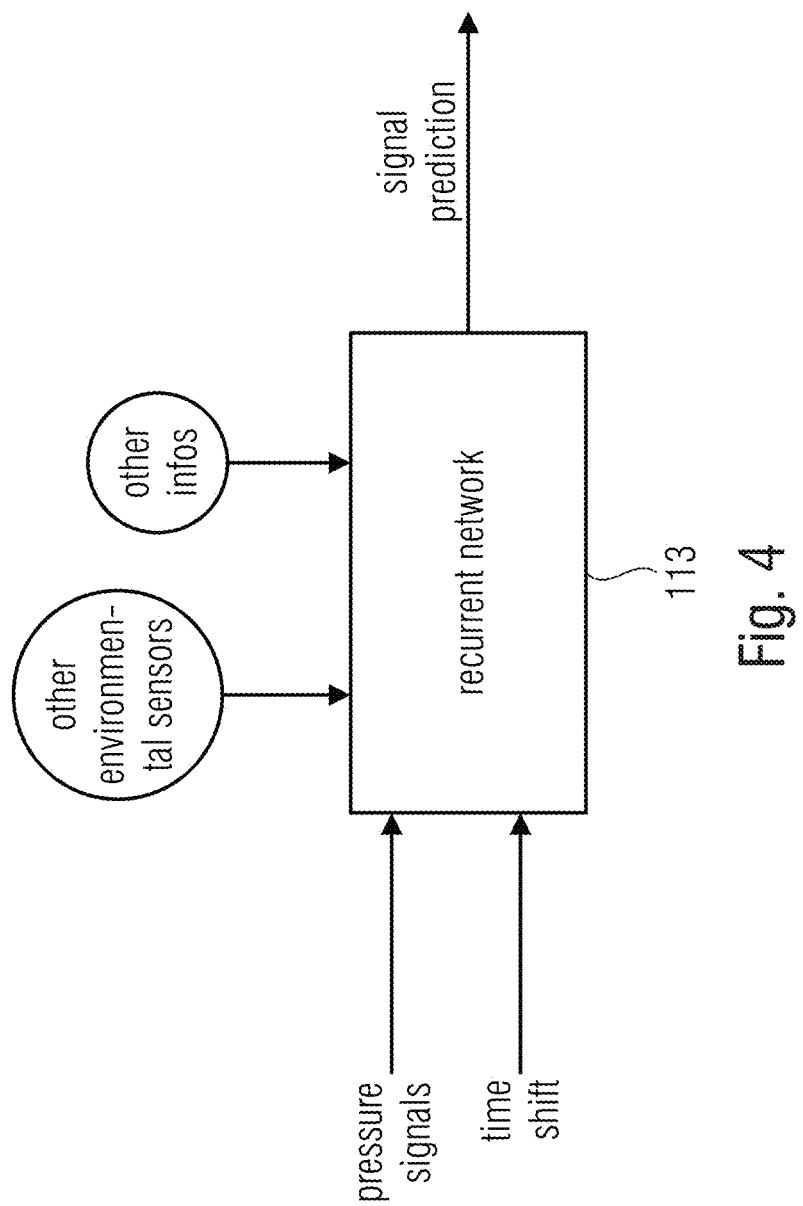
FIG. 4 illustrates a training of the recurrent network according to an embodiment.

FIG. 4 illustrates the training of the recurrent network 113 according to an embodiment. In particular, FIG. 4 illustrates the recurrent network 113 used to generate a signal prediction of the preprocessed pressure signal. To this end a time shift is also given and the correspondingly forward shifted version of the signal is used to train the recurrent network 113. A more accurate prediction may, e.g., be obtained if also the information from other environmental sensors is used to enrich the model. Weather conditions like wind or rain can for example affect the variance or standard deviation of the pressure signal and could also be incorporated in the prediction if available. Similarly, the size or type of windows might also affect the measured signal and could be accounted for in the model if desired.

Figure 5:
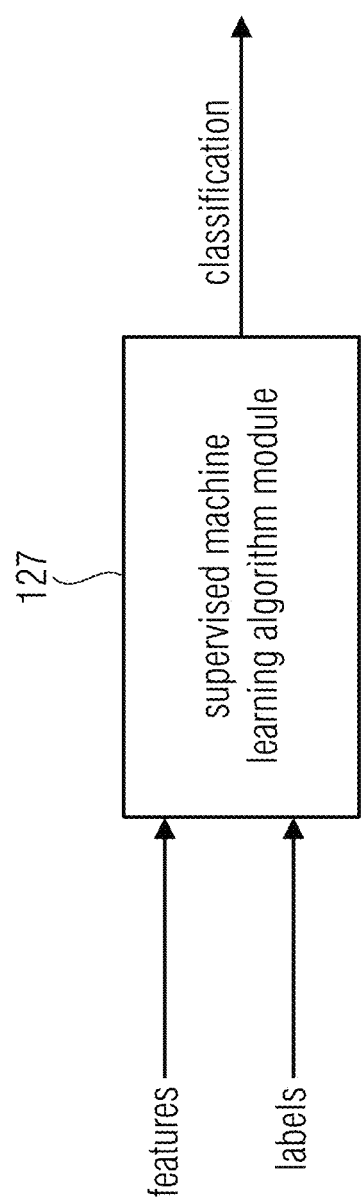
FIG. 5 illustrates a training of the supervised machine learning algorithm according to an embodiment.

FIG. 5 illustrates the training of the supervised machine learning algorithm (e.g., in a supervised machine learning algorithm module 127) according to an embodiment. In particular, FIG. 5 shows a typical setup for a supervised machined learning algorithms according to an embodiment, which accepts as inputs the calculated features and the corresponding labels and generates as an output a decision on the class and possibly also a confidence interval for this decision.

Some embodiments are based on a mechanism for the classification of the signals measured at a pressure sensor with the final goal of recognizing an intruder in an indoor environment. The proposed concepts may, e.g., comprise one or more of the following three features:

As a first feature, a recurrent network may, e.g., be trained to observe a pressure signal over time and generate a prediction of the preprocessed pressure signal itself.

As a second feature, a module may, e.g., be configured to combine the real pressure signal and its prediction, generates an error metric and judiciously calculates the input features for the classifier module 126.

As a third feature a classifier module 126 may, e.g., be configured to output in a supervised manner a decision on the event which has been observed.

The output of the classifier module 126 can then be combined with the output of other sensors such as microphone or $CO_2$ sensor for a more accurate decision on the observed event (sensor data fusion).

In the following, particular embodiments are described.

Figure 6:
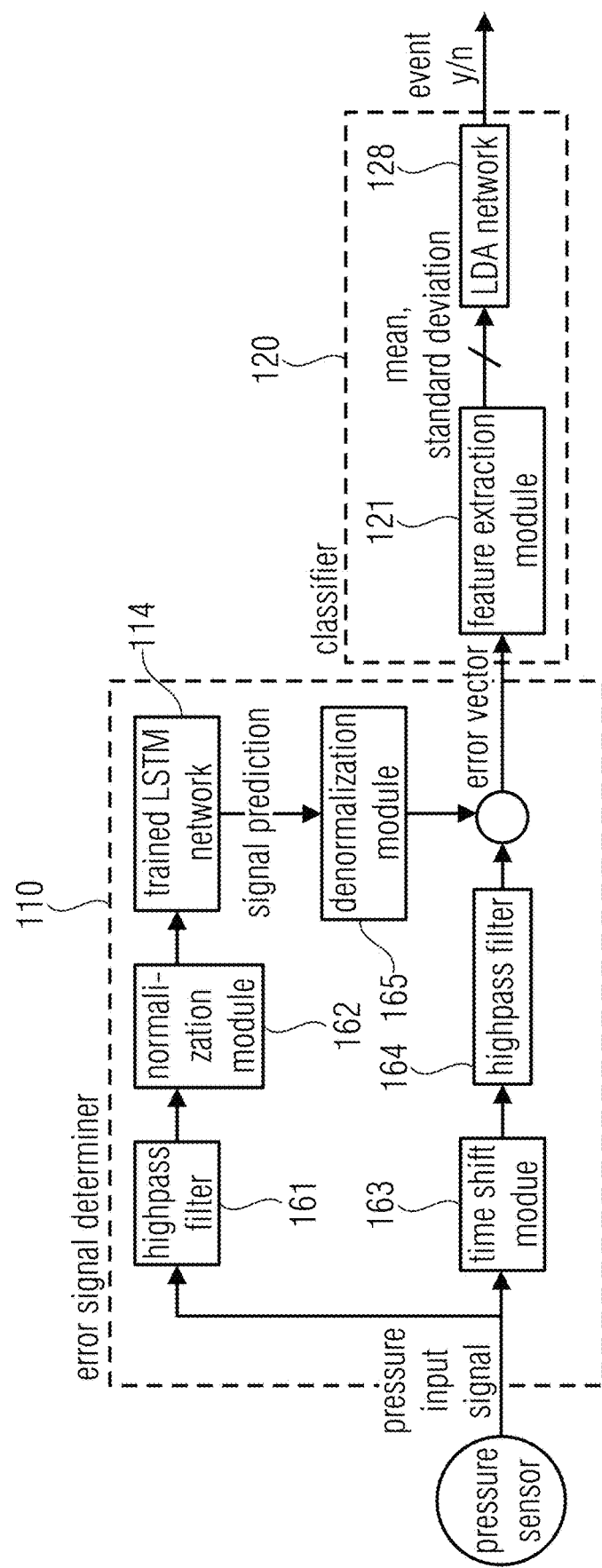
FIG. 6 illustrates a schematic representation of modules of a particular embodiment.

FIG. 6 illustrates a schematic representation of modules of a particular embodiment.

According to an embodiment, the pressure signal may, e.g., be a preprocessed pressure signal. The error signal determiner 110 may, e.g., be configured to determine the preprocessed pressure signal by preprocessing a pressure input signal. Moreover, the error signal determiner 110 may, e.g., be configured to conduct preprocessing so that preprocessing comprises applying a highpass filter 161, 164 on the pressure input signal.

In an embodiment, the error signal determiner 110 may, e.g., be configured to obtain a filtered pressure signal by applying the highpass filter 161 on the pressure input signal. The error signal determiner 110 may, e.g., be configured to conduct normalization on a first portion of the filtered pressure signal to obtain a first signal portion of the preprocessed pressure signal being said first signal portion of the pressure signal.

If normalization would be conducted not only in the first portion of the filtered pressure signal, but if the whole pressure signal would be normalized instead, denormalization would not be conducted.

In an embodiment, the neural network 113, 114 may, e.g., be a long-short term memory network 114.

In a particular embodiment illustrated by FIG. 6, the first preprocessing module 111 comprises a high-pass filter 161 for noise variance reduction and a normalization block 162 while the recurrent network 113 is a long-short term memory network (LSTM) 114 whose output is then de-normalized (e.g., by a denormalization module 165) prior to computing the error with the original high-pass filtered pressure sensor output. The original high-pass filtered pressure sensor output may, e.g., generated by time shifting the pressure signal, e.g., in a time shift module 163 and by highpass filtering the output of the time shift module 163, employing a highpass filter 164.

The classifier module 126 may, e.g., be an LDA network 128 (LDA=linear discriminant analysis). Linear discriminant analysis is a concept employed in machine learning, statistics and pattern recognition to determine a linear combination of features that characterizes or separates two or more classes of events or objects.

Figure 7:
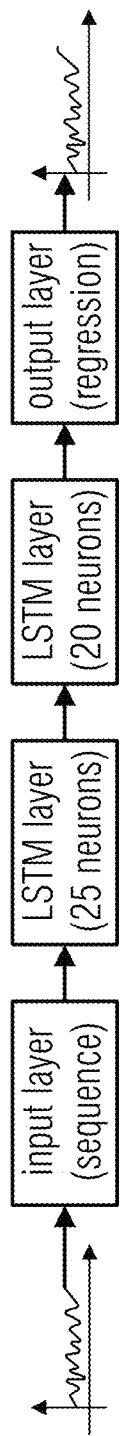
FIG. 7 illustrates a long-short term memory network according to an embodiment.

FIG. 7 illustrates a LSTM network 114 according to an embodiment. In particular, FIG. 7 illustrates the structure of the used LSTM network 114 of an embodiment with the preprocessed pressure signal as an input, two hidden layers with 25 and 20 neurons, respectively, and a regression layer which returns the time series prediction as an output.

Figure 8:
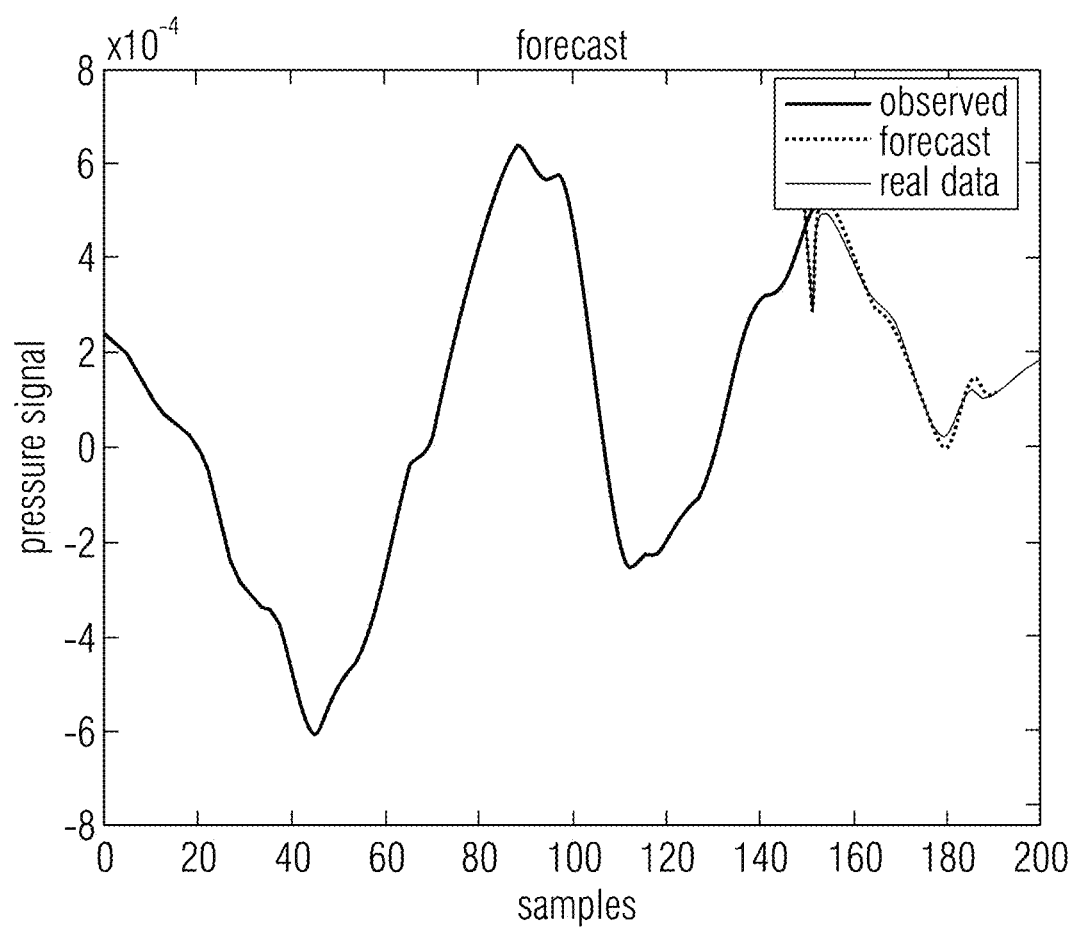
FIG. 8 illustrates a long-short term memory network output for training data according to an embodiment.

The output of the predictor is shown in FIG. 8 where it is seen that the signal prediction follows the trend of the signal. In particular, FIG. 8 illustrates a LSTM network output according to an embodiment.

Figure 9:
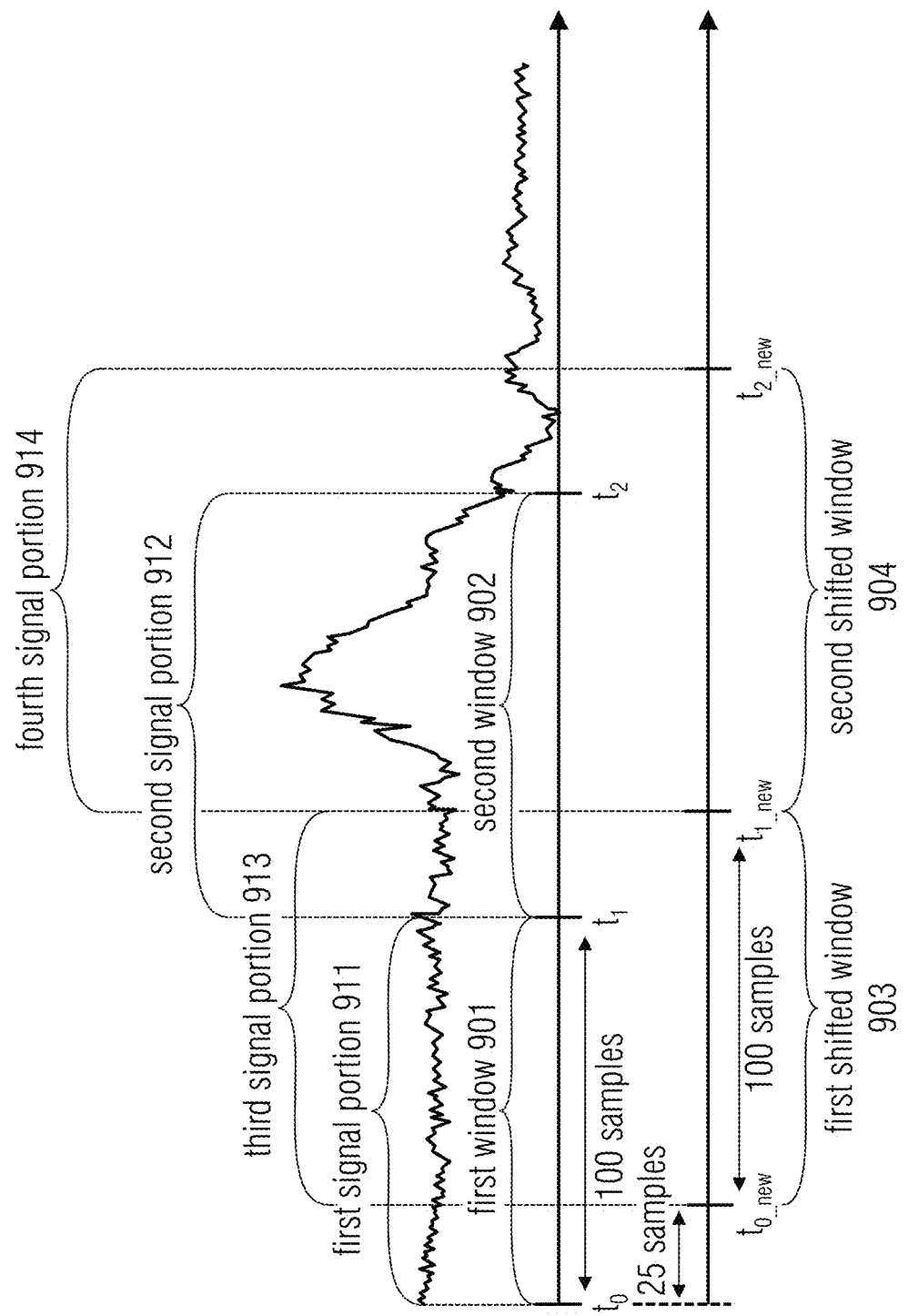
FIG. 9 illustrates a windowing for error vector calculation according to an embodiment.

In FIG. 9, the windowing approach is illustrated.

In particular, FIG. 9 illustrates a windowing for error vector calculation according to an embodiment.

The first 100 samples, from $t_0$ to $t_1$, are used as input for the LSTM network 114 to make the predictions.

With the predicted time samples and the 100 samples of the real pressure signal ($t_1$ to $t_2$) used as subtrahend, the error vector is calculated.

If it is concluded from the error vector that no event has occurred during the examined time interval of the time signal, the time signal is shifted e.g., by 25 samples, and the next 100 samples ($t_{0\_new}$ to $t_{1\_new}$) are used as input for the neural network.

If it is concluded from the error vector that a (e.g., particular) event has occurred during the examined time interval of the time signal, (e.g. after (positive) event classification), e.g., the memory buffer is emptied, and the window is shifted, e.g., by 150 samples. This is to ensure that the same event is not classified multiple times generating false alarms.

Thus, in more general embodiments that are explained with reference to FIG. 9, a first window 901 indicates the first signal portion 911 of the pressure signal, said first signal portion 911 comprising a first predetermined number of pressure samples, wherein each of the pressure samples of the first signal portion 911 is assigned to a point in time out of a plurality of points in time so that the first signal portion 911 is assigned to a first time interval.

A second window 902 indicates the second signal portion 912 of the pressure signal, said second signal portion 912 comprising a second predetermined number of pressure samples, wherein each of the pressure samples of the second signal portion 912 is assigned to a point in time out of the plurality of points in time so that the second signal portion 912 is assigned to a second time interval.

The classifier 120 may, e.g., be configured for determining, depending on the error signal portion, whether the event of said group of one or more events has occurred during the second time interval or whether no event of said group has occurred during the second time interval.

The error signal determiner 110 may, e.g., be configured for shifting the first window 901 by a third predefined number of samples to obtain a first shifted window 903 which indicates a third signal portion 913 of the pressure signal, said third signal portion 913 comprising the first predetermined number of pressure samples, wherein each of the pressure samples of the third signal portion 913 is assigned to a point in time out of the plurality of points in time so that the third signal portion 913 is assigned to a third time interval.

The error signal determiner 110 may, e.g., be configured for shifting the second window 902 by the third predefined number of samples to obtain a second shifted window 904 which indicates a fourth signal portion 914 of the pressure signal, said fourth signal portion 914 comprising the second predetermined number of pressure samples, wherein each of the pressure samples of the fourth signal portion 914 is assigned to a point in time out of the plurality of points in time so that the fourth signal portion 914 is assigned to a fourth time interval, wherein one or more points in time of the fourth time interval are not comprised by the second time interval, wherein said one or more points in time succeed in time each of the points in time of the second time interval.

The error signal determiner 110 may, e.g., be configured for determining an further error signal portion depending on the pressure signal, wherein the error signal determiner 110 may, e.g., be configured to determine a further predicted signal portion depending on the third signal portion 913 of the pressure signal, and wherein the error signal determiner 110 may, e.g., be configured to determine the further error signal portion depending on the further predicted signal portion and depending on the fourth signal portion 914 of the pressure signal, wherein the fourth signal portion 914 of the pressure signal succeeds the third signal portion 913 of the pressure signal in time.

The classifier 120 may, e.g., be configured for determining, depending on the further error signal portion, whether the event of said group of one or more events has occurred during the fourth time interval or whether no event of said group has occurred during the fourth time interval.

In an embodiment, the first predetermined number may, e.g., be smaller than or equal to a quarter of the second predetermined number. The second predetermined number may, e.g., be greater than or equal to 100, so that second signal portion comprises at least 100 pressure samples.

FIGS. 10a-10e illustrate error vectors of embodiments.

Figure 10B:
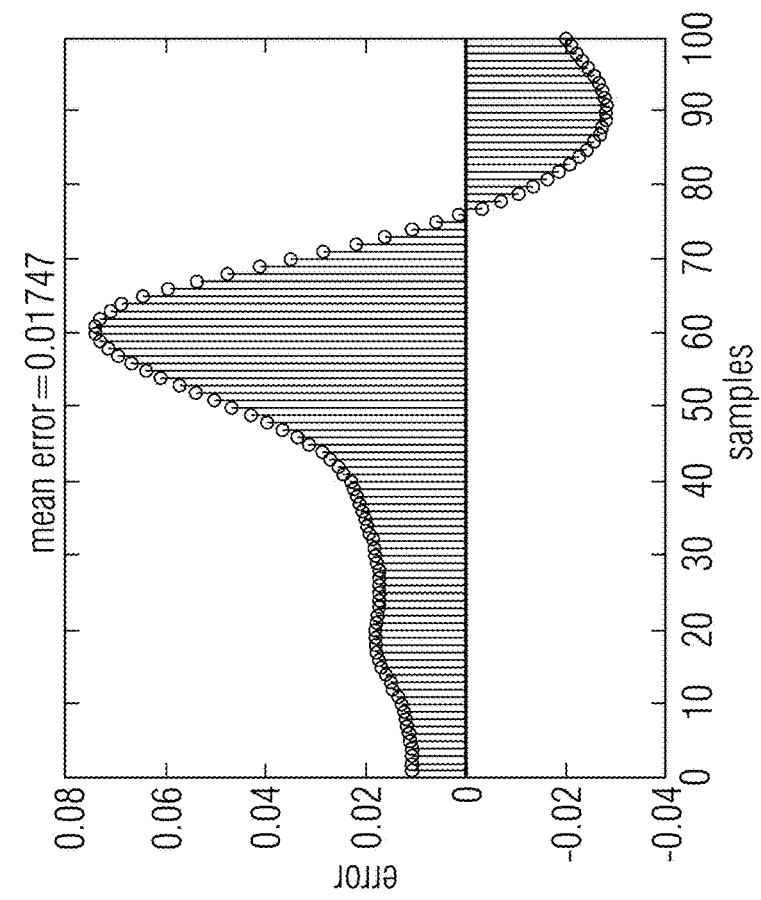
FIGS. 10a-10e illustrates error vectors of embodiment that were obtained at the output of an error metric computation for different types of events.
Figure 10A:
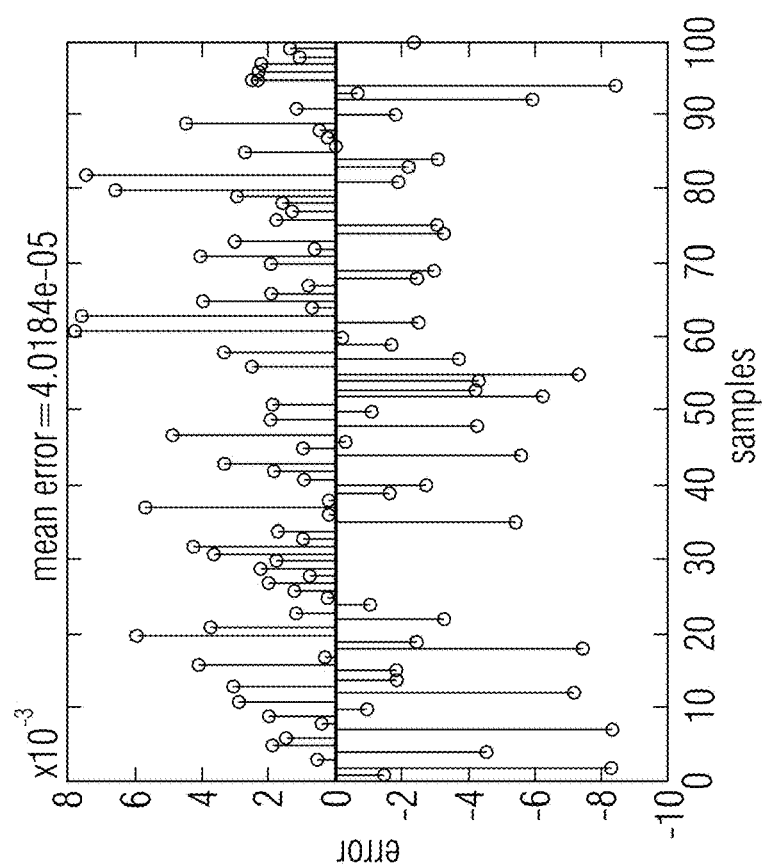
Figure 10D:
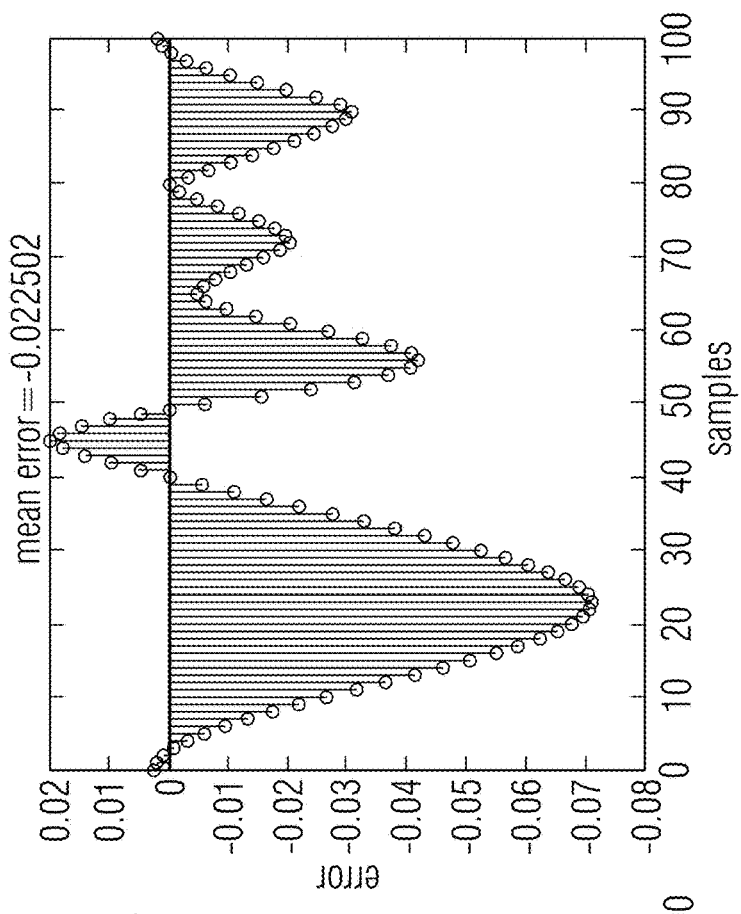
Figure 10C:
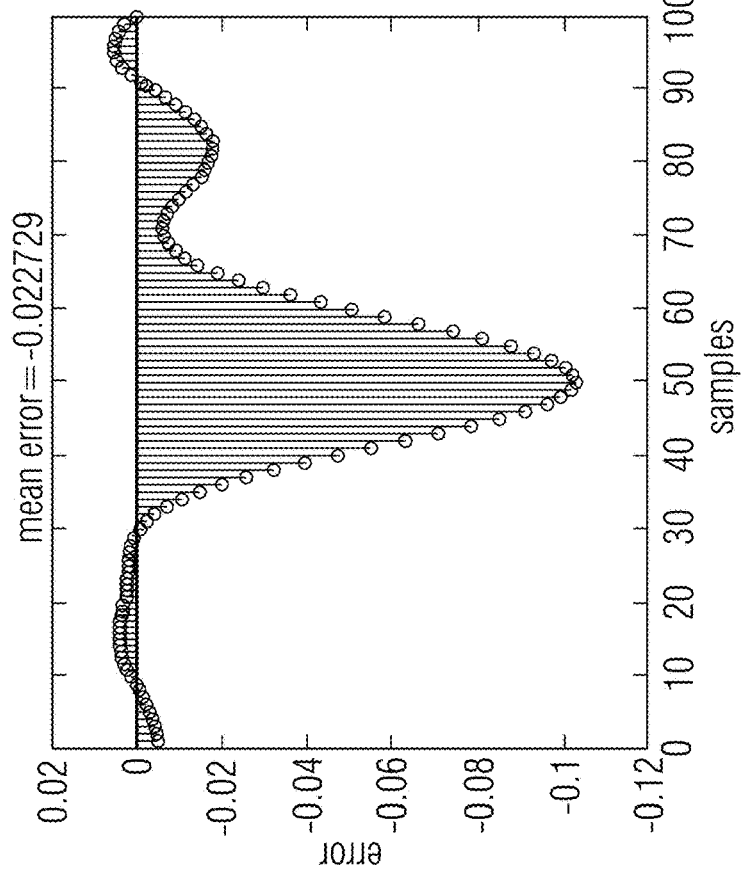
Figure 10E:
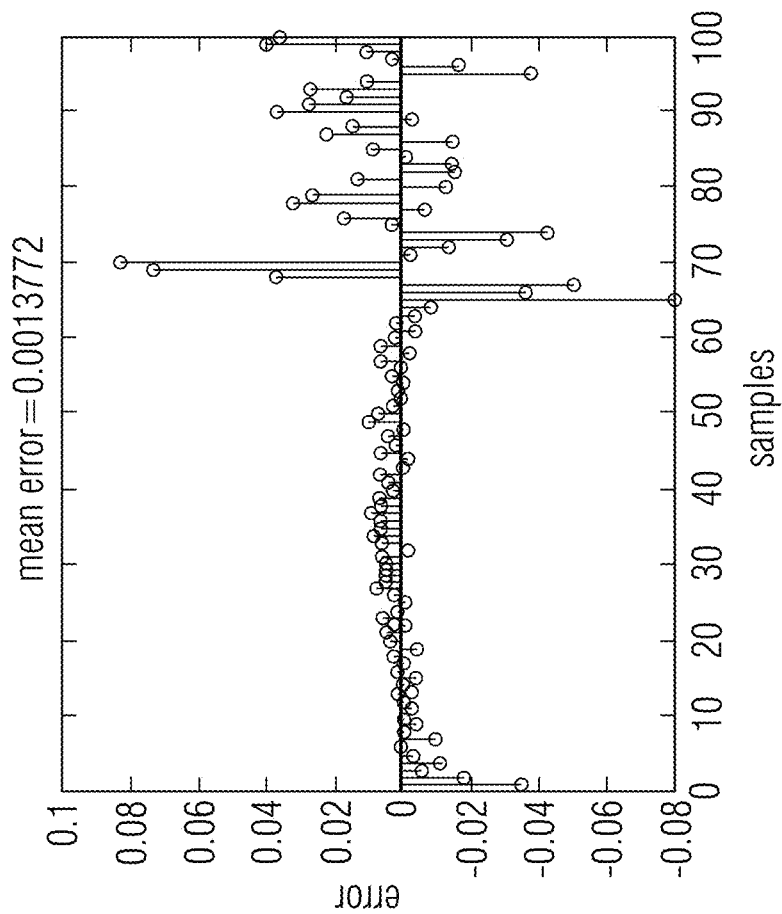

FIGS. 10-10e illustrate error vectors of embodiment that were obtained at the output of an error metric computation for different types of events. In particular, FIG. 10a illustrates a situation, where nothing/no event occurred. FIG. 10b illustrates a closing event. FIG. 10c illustrates an opening event. FIG. 10d illustrates a tilting event. FIG. 10e illustrates a glass breaking event.

Error vectors may, e.g., have substantially different shapes which shall be appropriately captured with the correct features and used to classify the event observed at the pressure sensor.

Once the error vector has been obtained, the features for classification can be computed.

Figure 11:
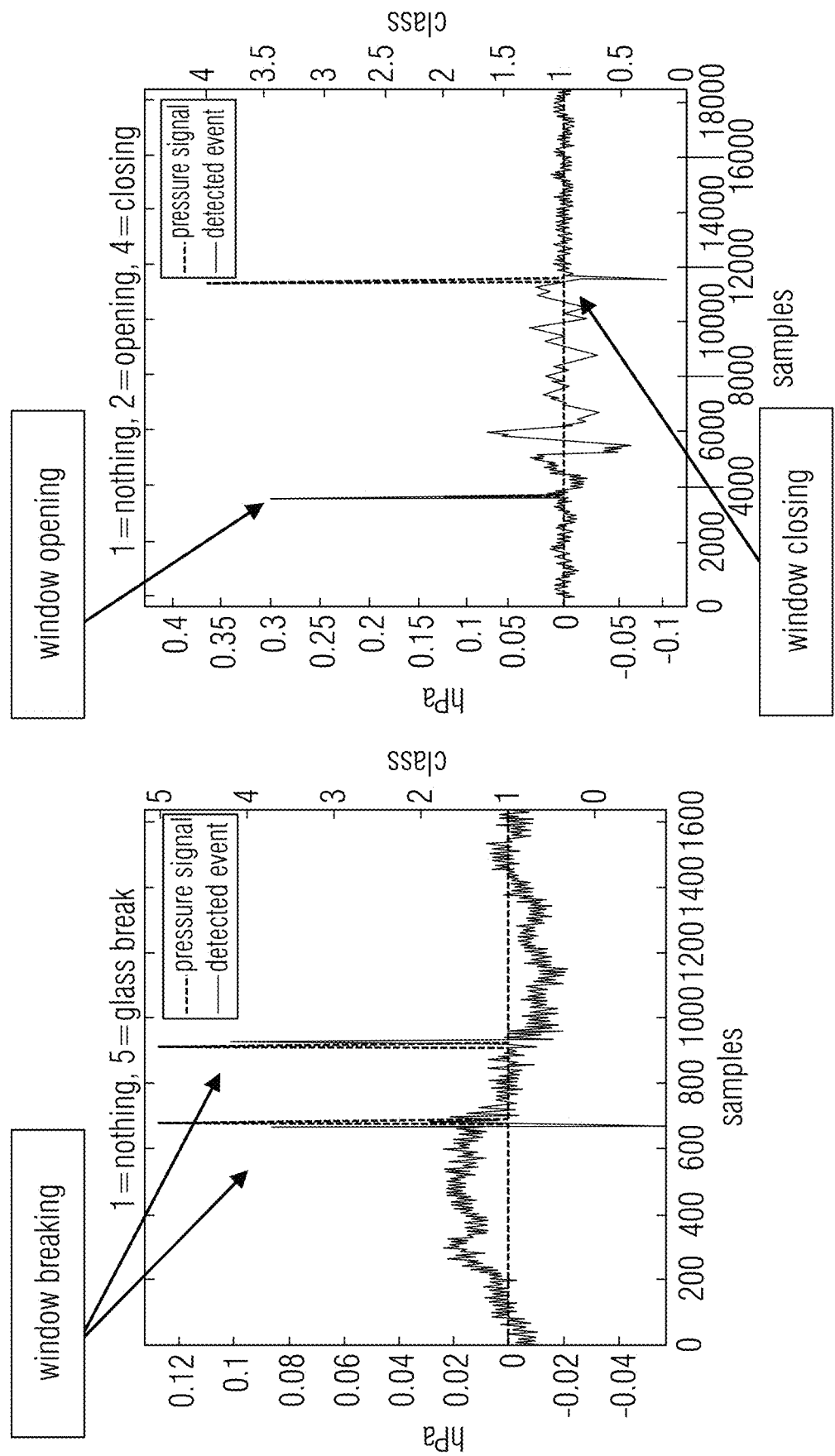
FIG. 11 illustrates classification results of a linear discriminant analysis algorithm.

In FIG. 11, the classification results of a Linear Discriminant Analysis Algorithm (LDA) are depicted. As input the mean value, the standard deviation, the absolute maximum value and the derivative of the error signal are used.

For example, as illustrated by FIG. 3 and FIG. 6, in embodiments, the classifier 120 may, e.g., comprise a feature extraction module 121 and a classifier module 126; 127; 128.

The feature extraction module 121 may, e.g., be configured to determine one or more features of the error signal portion.

The classifier module 126; 127; 128 may, e.g., be configured to determine, depending on the one or more features of the error signal, which event out of said group of two or more events has occurred or whether no event of said group has occurred.

The one or more features may, e.g., comprise at least one of an absolute maximum of the error signal portion, a mean value of the error signal portion, a standard deviation of the error signal portion and a derivative of the error signal portion.

According to an embodiment, the one or more features may e.g., comprise the absolute maximum of the error signal portion.

In an embodiment, the classifier 120 module may, e.g., be configured to employ a linear discriminant analysis algorithm to determine, depending on the one or more features of the error signal, which event out of said group of two or more events has occurred or whether no event of said group has occurred.

It can be seen that different type of events such as window closing, window opening, window tilting and window breaking can be correctly classified. It is clear that only some of these events will trigger an alarm (window opening/tilting and glass break) for an intruder while other (window closing) might not be relevant. Still, our algorithm will be able to classify and recognize them.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. An apparatus for event detection, wherein the apparatus comprises:
   a barometric pressure sensor for generating a pressure signal;
   an error signal determiner configured for determining an error signal portion depending on the pressure signal, wherein the error signal determiner is configured to determine a predicted signal portion depending on a first signal portion of the pressure signal, and wherein the error signal determiner is configured to determine the error signal portion depending on the predicted signal portion and depending on a second signal portion of the pressure signal, wherein the second signal portion of the pressure signal succeeds the first signal portion of the pressure signal in time, and
   a classifier configured for determining, depending on the error signal portion, whether an event of a group of one or more events has occurred or whether no event of said group has occurred.

2. The apparatus according to claim 1,
wherein said group is a group of two or more events,
wherein the classifier is configured for determining, depending on the error signal portion, which event out of a group of two or more events has occurred or whether no event of said group has occurred.

3. The apparatus according to claim 2,
wherein the classifier comprises a feature extraction module and a classifier module,
wherein the feature extraction module is configured to determine one or more features of the error signal portion, and
wherein the classifier module is configured to determine, depending on the one or more features of the error signal portion, which event out of said group of two or more events has occurred or whether no event of said group has occurred,
wherein the one or more features comprise at least one of an absolute maximum of the error signal portion, a mean value of the error signal portion, a standard deviation of the error signal portion and a derivative of the error signal portion.

4. The apparatus according to claim 3,
wherein the one or more features comprise the absolute maximum of the error signal portion.

5. The apparatus according to claim 3,
wherein the classifier module is configured to employ a linear discriminant analysis algorithm to determine, depending on the one or more features of the error signal portion, which event out of said group of two or more events has occurred or whether no event of said group has occurred.

6. The apparatus according to claim 2,
wherein a first event of the group of two or more events is a window opening, and
wherein a second event of the group of two or more events is a glass break.

7. The apparatus according to claim 1,
wherein the error signal determiner is configured to determine the error signal portion by subtracting the second signal portion from the predicted signal portion, or
wherein the error signal determiner is configured to determine the error signal portion by subtracting the predicted signal portion depending on the second signal portion.

8. The apparatus according to claim 1,
wherein the error signal determiner is configured to determine the predicted signal portion by employing a neural network, or
wherein the error signal determiner is configured to determine the predicted signal portion by employing the neural network, wherein said neural network is a long-short term memory network.

9. The apparatus according to claim 1,
wherein the error signal determiner is configured to determine the error signal portion further depending on information on weather conditions.

10. The apparatus according to claim 1,
wherein the pressure signal is a preprocessed pressure signal, wherein the error signal determiner is configured to determine the preprocessed pressure signal by preprocessing a pressure input signal, wherein the error signal determiner is configured to conduct preprocessing so that preprocessing comprises applying a highpass filter on the pressure input signal.

11. The apparatus according to claim 10,
wherein the error signal determiner is configured to obtain a filtered pressure signal by applying the highpass filter on the pressure input signal, and wherein the error signal determiner is configured to conduct normalization on a first portion of the filtered pressure signal to obtain a first signal portion of the preprocessed pressure signal being said first signal portion of the pressure signal.

12. The apparatus according to claim 1,
wherein a first window indicates the first signal portion of the pressure signal, said first signal portion comprising a first predetermined number of pressure samples, wherein each of the pressure samples of the first signal portion is assigned to a point in time out of a plurality of points in time so that the first signal portion is assigned to a first time interval, wherein a second window indicates the second signal portion of the pressure signal, said second signal portion comprising a second predetermined number of pressure samples, wherein each of the pressure samples of the second signal portion is assigned to a point in time out of the plurality of points in time so that the second signal portion is assigned to a second time interval, wherein the classifier is configured for determining, depending on the error signal portion, whether the event of said group of one or more events has occurred during the second time interval or whether no event of said group has occurred during the second time interval, wherein the error signal determiner is configured for shifting the first window by a third predefined number of samples to obtain a first shifted window which indicates a third signal portion of the pressure signal, said third signal portion comprising the first predetermined number of pressure samples, wherein each of the pressure samples of the third signal portion is assigned to a point in time out of the plurality of points in time so that the third signal portion is assigned to a third time interval, wherein the error signal determiner is configured for shifting the second window by the third predefined number of samples to obtain a second shifted window which indicates a fourth signal portion of the pressure signal, said fourth signal portion comprising the second predetermined number of pressure samples, wherein each of the pressure samples of the fourth signal portion is assigned to a point in time out of the plurality of points in time so that the fourth signal portion is assigned to a fourth time interval, wherein one or more points in time of the fourth time interval are not comprised by the second time interval, wherein said one or more points in time succeed in time each of the points in time of the second time interval, wherein the error signal determiner is configured for determining an further error signal portion depending on the pressure signal, wherein the error signal determiner is configured to determine a further predicted signal portion depending on the third signal portion of the pressure signal, and wherein the error signal determiner is configured to determine the further error signal portion depending on the further predicted signal portion and depending on the fourth signal portion of the pressure signal, wherein the fourth signal portion of the pressure signal succeeds the third signal portion of the pressure signal in time, and wherein the classifier is configured for determining, depending on the further error signal portion, whether the event of said group of one or more events has occurred during the fourth time interval or whether no event of said group has occurred during the fourth time interval.

13. The apparatus according to claim 12,
wherein the first predetermined number is smaller than or equal to a quarter of the second predetermined number, wherein the second predetermined number is greater than or equal to 100, so that second signal portion comprises at least 100 pressure samples.

14. A method for event detection, wherein the method comprises:
in an apparatus comprising a barometric pressure sensor for generating a pressure signal,
determining an error signal portion depending on the pressure signal, wherein determining the error signal portion comprises to determine a predicted signal portion depending on a first signal portion of the pressure signal, and wherein determining the error signal portion further comprises to determine the error signal portion depending on the predicted signal portion and depending on a second signal portion of the pressure signal, wherein the second signal portion of the pressure signal succeeds the first signal portion of the pressure signal in time, and
determining, depending on the error signal portion, whether an event of a group of one or more events has occurred or whether no event of said group has occurred.

15. The method of claim 14, wherein determining the error signal portion and determining whether an event of a group of one or more events has occurred are implemented by a computer program when being executed on a computer or signal processor.

* * * * *